United States Patent
Allyn

(10) Patent No.: US 9,881,184 B2
(45) Date of Patent: Jan. 30, 2018

(54) AUTHENTICITY-ASSURED DATA GATHERING APPARATUS AND METHOD

(71) Applicant: Intel Corporation, Santa Clara, CA (US)

(72) Inventor: Mark A Allyn, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 120 days.

(21) Appl. No.: 14/927,782

(22) Filed: Oct. 30, 2015

(65) Prior Publication Data

US 2017/0124356 A1    May 4, 2017

(51) Int. Cl.
| | |
|---|---|
| *G06F 11/30* | (2006.01) |
| *G06F 21/87* | (2013.01) |
| *G06F 21/71* | (2013.01) |
| *G06F 21/60* | (2013.01) |
| *H04L 9/30* | (2006.01) |
| *H04L 9/14* | (2006.01) |

(52) U.S. Cl.
CPC ............ *G06F 21/87* (2013.01); *G06F 21/602* (2013.01); *G06F 21/71* (2013.01); *H04L 9/14* (2013.01); *H04L 9/30* (2013.01)

(58) Field of Classification Search
None
See application file for complete search history.

(56) References Cited

U.S. PATENT DOCUMENTS

| | | | | |
|---|---|---|---|---|
| 6,396,400 | B1* | 5/2002 | Epstein, III | G06F 21/86 340/540 |
| 8,868,927 | B1* | 10/2014 | Lee | G06F 21/83 713/189 |
| 2003/0101348 | A1* | 5/2003 | Russo | G06K 9/00026 713/185 |
| 2006/0085844 | A1* | 4/2006 | Buer | H04L 63/068 726/4 |
| 2007/0239604 | A1* | 10/2007 | O'Connell | G06Q 30/06 705/50 |

(Continued)

FOREIGN PATENT DOCUMENTS

WO    WO-2017074564 A1    5/2017

OTHER PUBLICATIONS

"International Application Serial No. PCT/US2016/050756, International Search Report dated Dec. 22, 2016", 3 pgs.

(Continued)

*Primary Examiner* — Fatoumata Traore
(74) *Attorney, Agent, or Firm* — Schwegman Lundberg & Woessner, P.A.

(57) ABSTRACT

Data is captured by a data capture apparatus in a manner to ensure authenticity of the data to the data capture apparatus. Transducer signaling is generated in response to physical excitation of one or more transducers, and is digitized to produce digital signaling. A cryptographic key is stored in association with the data capture apparatus. At least portions of the digital signaling are digitally signed based on the cryptographic key to produce an authenticatable set of captured data. A security boundary is provided within which the digitizing, storing, and digitally signing are performed. Production of the authenticatable set of captured data is prevented in response to a breach of the security boundary.

21 Claims, 10 Drawing Sheets

(56) References Cited

U.S. PATENT DOCUMENTS

| | | | |
|---|---|---|---|
| 2008/0201580 A1* | 8/2008 | Savitzky | G06F 21/725 |
| | | | 713/189 |
| 2008/0298642 A1* | 12/2008 | Meenen | G06K 9/00 |
| | | | 382/115 |
| 2013/0121490 A1 | 5/2013 | Boliek et al. | |
| 2013/0160134 A1 | 6/2013 | Marcovecchio et al. | |
| 2014/0049653 A1 | 2/2014 | Leonard et al. | |
| 2014/0181534 A1 | 6/2014 | Nowottnick | |
| 2014/0281586 A1 | 9/2014 | Loisel et al. | |

OTHER PUBLICATIONS

"International Application Serial No. PCT/US2016/050756, Written Opinion dated Dec. 22, 2016", 8 pgs.

* cited by examiner

AUTHENTICITY-ASSURED DATA GATHERING APPARATUS AND METHOD

TECHNICAL FIELD

Embodiments described herein generally relate to information processing and, more particularly, to providing captured data, such as video or sound recordings, in such a manner that assures authenticity of at least the data capture device.

BACKGROUND

Data capture devices have become ubiquitous in modern society with the advancement of electronic technologies relating to digital image and video capture, data processing, data storage, location and movement detection, data communications, as well as concurrent developments in system integration and battery technologies. Practically every smartphone has an assortment of data capture devices, such as one or more video cameras, a global positioning system (GPS) sensor, an accelerometer, and a magnetometer, along with processing facilities and software applications that make using these functions simple and intuitive for lay person users.

Variations or subsets of these data capture technologies are found in a variety of other consumer, commercial, and industrial products having different form-factors and usage profiles. For instance, smartphone technology has been incorporated into wearable products such as glasses. Accessory devices, such as smartwatches, which in some cases may be usable as stand-alone data capture devices in their own right, are rapidly growing in popularity. Security cameras, which may be Internet-accessible by their operators, as well as closed-system security arrangements that store data in digital format, are becoming increasingly common in homes and businesses. Data capture devices may store the captured data locally, such as the case with ruggedized "action" cameras that are optimized for sports and underwater use, or in a remote location, such as on a local-area network file server, or remote cloud service.

With today's wide availability of data capture devices it is becoming increasingly common for significant events to be captured by a device that happens to be in the vicinity of the event. Significant events may include crimes, accidents, disputes, acts of terrorism, natural or man-made disasters, as well as unusual phenomena, incredible human achievements, and the like, for which a record of proof, or investigation of evidence, may be warranted. Unfortunately, records of significant events are subject to fabrication, alteration, or other tampering, bringing into question the veracity of any given record of a captured event. Different data may be substituted, and falsely attributed to a data capture device, for instance, or the time and location of a set of captured data may be manipulated by an actor seeking to mislead an investigation. More sophisticated tampering may change the content of a set of captured data to add or remove certain subjects or actions of interest. As a result, data that is presented as having been recorded by a conventional data capture device is not always reliable as such.

In the legal context, for example, saved data is subject to authentication by establishing a clear chain of custody of the stored data from the time of capture, to the storage devices, to the presentation of that data in a legal proceeding. Along this chain of custody, there are numerous links that may be susceptible to tampering or interference, whether by hacking attack, manipulation by an insider, access by third party storage or data communication service providers, etc. In addition, the person having operated the data capture device may be unavailable, e.g., deceased, hostile or uncooperative, undesirable as a witness for public policy reasons (e.g., a minor or victim of sexual violence) or an interested party in the legal proceeding, making them subject to impeachment.

In view of the above, a practical technological solution is needed to address the problem of captured data authenticity.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Aspects of the invention are directed to authenticating captured data to the data capture device. Captured data in the present context is data, stored in at least one non-transitory tangible medium, representing a physical event as sensed by one or more transducers. Examples of captured data include (without limitation) video data, audio data, device positional data (e.g., from GPS or terrestrial trilateration via radio signal), motion/acceleration data (e.g., via accelerometer or gyroscope), illumination data, pressure data, temperature data, device orientation data (e.g., via magnetometer or other compass), motion detection data, perimeter breach detection data, etc. Captured data may also include biometric data, such as fingerprint detector output, corneal scan information, etc.

A data capture device in the present context may take any of a variety of device types. For instance, it may be a multi-functional device such as a smartphone, tablet, laptop, desktop PC, smartwatch, wearable form factor (e.g., glasses embedded in garment), etc. A data capture device may also be a dedicated device for capturing a type of data, such as a video camera, sound recorder, security camera, security access device such as a doorbell, motion or perimeter breach detector, door lock, or other access control system. Moreover, a data capture device may constitute an external, wearable, or implantable medical or fitness-monitoring device. Examples include heart rate monitors, infusion pumps, electrocardiogram instruments, blood pressure instruments, ultrasound instruments, automated external defibrillators (AEDs), data loggers, motion monitors, pacemakers, implantable cardioverter-defibrillators (ICDs), etc. A data capture device may also include a parameter-measuring instrument, such as an industrial pressure sensor, flowmeter, proximity sensor, chemical detector, strain gauge, etc. Furthermore, it should be understood that a data capture device may be a part of a greater system, such as an unmanned aerial vehicle (UAV), for example.

Figure 1:
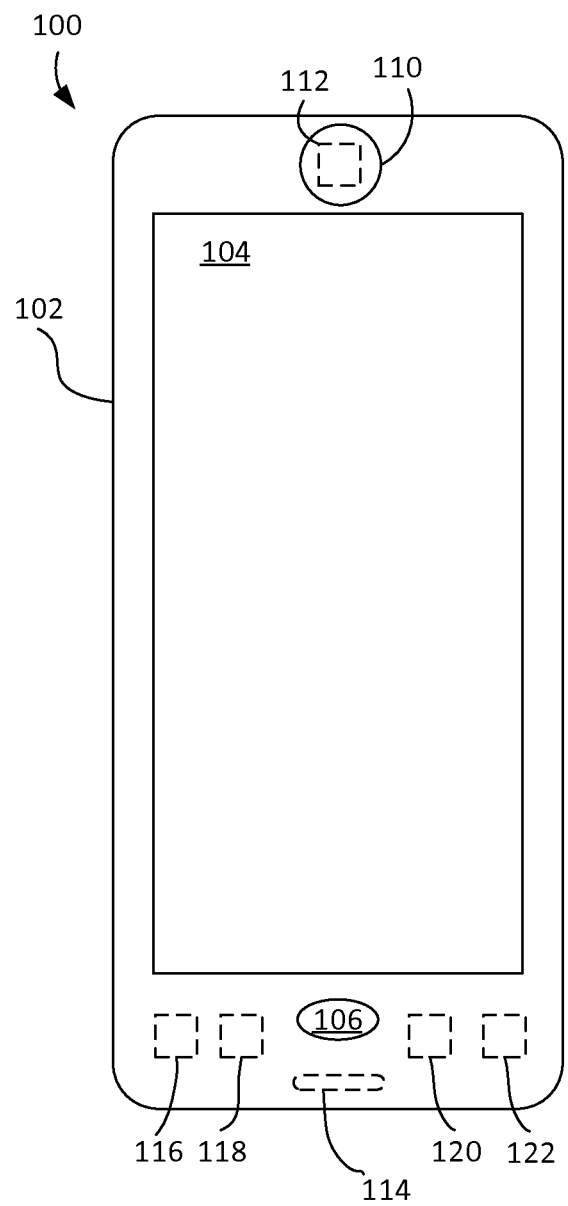
FIG. 1 is a block diagram illustrating some of the components of an example data capture device according to an embodiment of the invention.

FIG. 1 is a block diagram illustrating some of the components of an example data capture device 100 according to one embodiment of the invention. Data capture device 100 is illustrated as a smartphone in this example, through it will be understood that data capture device is representative of other types of data capture devices, which may have more or fewer transducers or other features than exemplary data capture device 100. Data capture device 100 has a housing 102 that encloses the interior components. Housing 102 may provide access to the interior of device 100 to some degree. For instance, in devices with a user-replaceable battery, flash memory card, or subscriber identity module (SIM) card, housing 102 may include a user-removable cover. In devices having a design that does not facilitate user access to the interior, housing 102 may nonetheless have a provision for permitting access to technicians so that certain components may be repaired or replaced if needed.

In another embodiment, housing 102 may be formed or assembled in a permanent fashion to prevent access to the interior of the device. In this case, access to the interior of the device may still be obtained, although it may result in irreversible damage or modification to the housing 102. Still, it remains possible to access the device's interior while preserving the operability of various components of device 100.

Data capture device 100 further includes touchscreen 104, which may form a part of the overall enclosure of device 100 in cooperation with housing 102. Touchscreen 104 includes hardware that functions as an output device (e.g., an LED screen for visual display, power and controller circuitry, etc.), and an input device generally layered over the visual display and formed from a suitable touch-sensitive technology (e.g., capacitive, resistive, optical, ultrasonic, etc.), along with the corresponding detection and power circuitry. Additionally, data capture device 100 includes user input device 106, which in this example represents one or more user-operable input devices, such as button(s), keypad, keyboard, trackpad, mouse, etc.

As further depicted in FIG. 1, data capture device 100 has several sensing transducers, the physical stimulation of which produces signaling that may be sampled, digitized, and stored as captured data. Camera 110 includes an image sensor 112, along with additional hardware for digitizing, processing, and storing portions of the image sensor 112 output. Camera 110 also includes optics that may form a portion of housing 102. Camera 110 may record still images, motion video, or both.

Microphone 114 includes audio capture circuitry that samples, digitizes, and stores portions of the signaling produced by microphone 114 in response to sensed acoustic stimulus. Microphone 114 is typically activated together with camera 110 when data capture device 100 is operated to record videos.

Global positioning system (GPS) receiver 116 includes an antenna and radio receiver circuitry to receive multiple signals being broadcast by a constellation of Earth-orbiting satellites, along with processing circuitry to discern the current position on the Earth of data capture device 100. Accelerometer 118 includes a multi-axis sensor that produces signaling in response to changes in motion, and electronics to sample and digitize that signaling. Magnetometer 120 includes sensors and supporting circuitry that detect the direction and intensity of the ambient magnetic field, or any externally-applied magnetic fields. Biometric sensor 122 includes an array of sensors for measuring a biometric indicator, such as a user's fingerprint, along with supporting circuitry.

According to embodiments of the invention, one or more of the sensing transducers are implemented as part of a trusted transducer module (TTM), which is constructed, programmed, or otherwise configured, to provide assurance of the authenticity of the data captured from each associated transducer's output. Data capture device 100 may include one or more TTEs, which are described in greater detail below.

Figure 2:
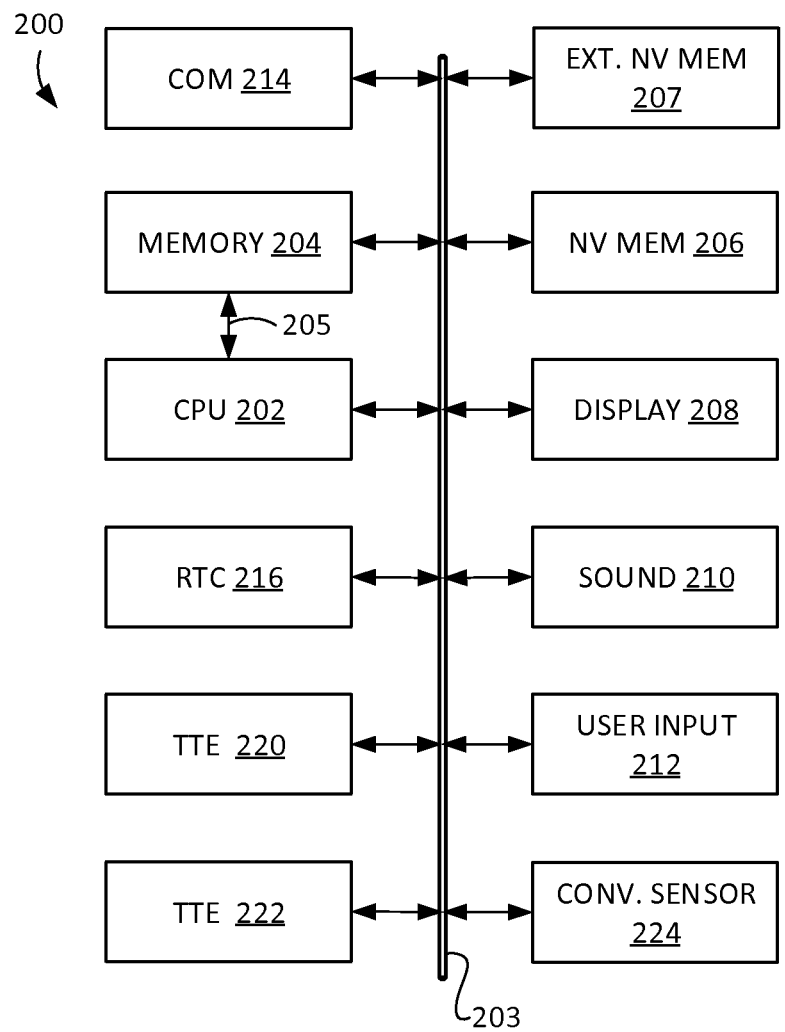
FIG. 2 is a block diagram illustrating an exemplary system architecture of a data capture device such as the device of FIG. 1, according to an embodiment.

FIG. 2 is a block diagram illustrating an exemplary system architecture 200 of data capture device 100 according to one embodiment. Central processor unit (CPU) 202 includes one or more microprocessors on which the overall functionality of data capture device 100 is executed. CPU 202 is electrically interfaced with system link 203, which carries data and control signaling between the various components. As illustrated, system link 203 is similarly interfaced with each of the other components of system architecture 200. Memory 204 includes working memory space, and is constructed from suitable high-speed memory devices such as synchronous dynamic random access memory (SDRAM). In the embodiment illustrated, CPU 202 may access memory 204 using high-speed interface 205. Non-volatile memory 206 is constructed using flash or other suitable non-volatile storage technology. Non-volatile memory 206 stores system and application software that is executed by CPU 202 and, in some cases, by processors present in one or more other components.

External non-volatile memory 207 includes an interface such as a secure digital (SD) card slot, which may accept removable storage media to be used as additional non-volatile data storage.

Display 208 includes display 104 and circuitry for interfacing the display 104 with the system, as well as video driving circuity. Sound 210 contains circuitry for driving the audio output to a speaker or headphones, and the circuitry for interfacing with the system. User input 212 contains the circuitry for interfacing with input devices such as input device 106. Communications block 214 represents communications circuitry and circuitry for interfacing the communications circuitry with the system. Communications block 214 may include a radio for communicating over a cellular network such as a network designed according to the Long- Term Evolution (LTE) or Global System for Mobile Communications (GSM) standards. Also, communications circuitry 214 may include a Wi-Fi communications radio according to the IEEE 801.11 standard, or a Bluetooth radio circuit according to the IEEE 802.15 standard. Real-time clock 216 includes circuitry that provides a clock that maintains the current date and time, and that interfaces the clock to the system.

System architecture 200 further includes a first TTM 220 and a second TTM 222 according to embodiments of the invention. In one embodiment, each TTM 220, 222 includes one or more sensing transducers, circuitry that reads and digitizes the transducer signaling and interfaces with link 203, a mechanism for digitally signing the transducer signaling, and a tamper-resistant encapsulation. Data captured using TTM 220 or 222 may be authenticated, and traceable to data capture device 100.

It is also contemplated that a conventional sensor, such as sensor 224 (i.e., without a corresponding TTM) may be included in the system along-side TTM 220 and TTM 222. Unlike the data captured using either TTM, the data captured using conventional sensor 224 lacks the provisions for being authenticated.

Figure 3:
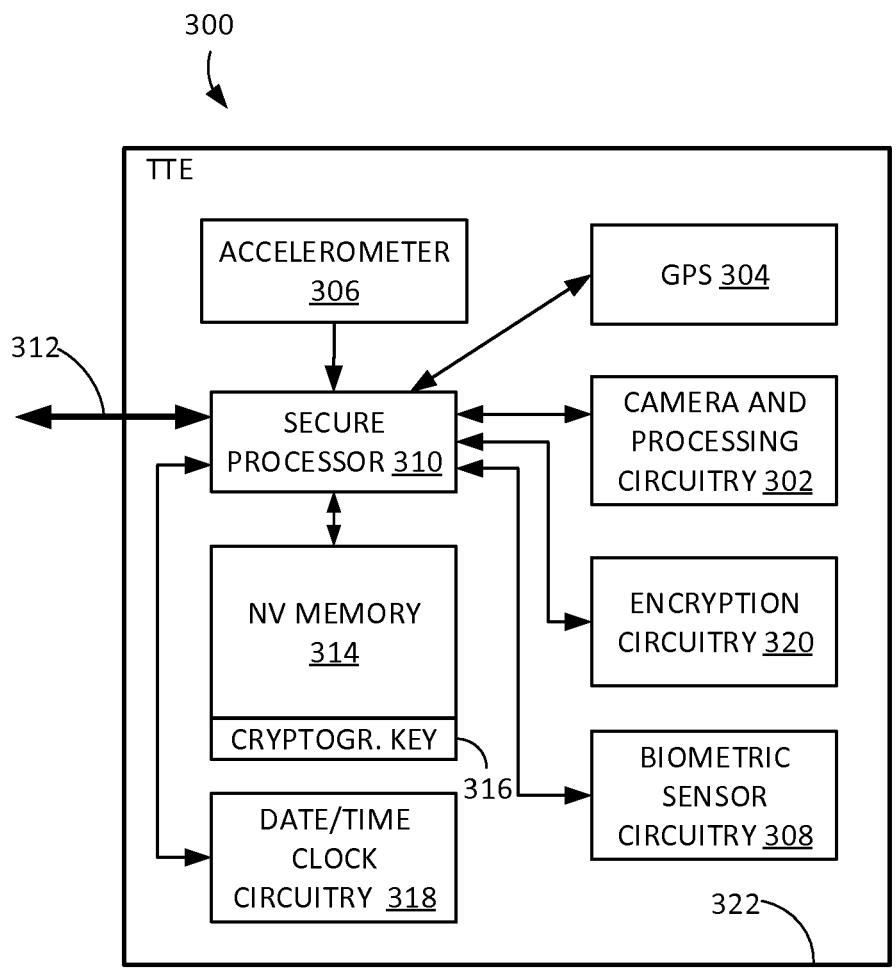
FIG. 3 is a block diagram illustrating an exemplary trusted transducer module (TTM) that may be a part of a data capture device according to an aspect of the invention.

FIG. 3 is a block diagram illustrating an exemplary TTM 300 according to one embodiment. TTM 300 includes a plurality of sensing transducers and their associated processing and interface circuitry, namely, camera 302, GPS 304, accelerometer 306, and biometric sensor 308. As will be described in greater detail below, each of these sensing transducers includes the transducer itself, or at least a transducer signal input node that connects directly to the transducer, as well as the associated processing and interface circuitry for interfacing the transducer with secure processor 310.

In the case of camera 302, the transducer is an image sensor device, such as a charge-coupled device (CCD) array or a complementary metal-oxide semiconductor (CMOS)-based sensor. In the case of GPS 304, the transducer is one or more GPS signal-receiving antennas. In the case of accelerometer 306, the transducer may be a micro electro-mechanical system (MEMS)-based device utilizing capacitive, piezoelectric, or other suitable technology to produce electrical signaling. In the case of biometric sensor 308, the transducer may be any suitable optical, capacitive, ultrasonic, chemical, or other sensor. It will be understood that these examples are provided herein for illustration and context, and are not meant to be limiting unless expressly enumerated in a particular claim.

The processing circuitry associated with each corresponding transducer may include amplification, buffering, filtering, or other signal-conditioning circuitry to receive the raw analog signal from the corresponding transducer and prepare the analog signaling for digitization, analog-to-digital conversion circuitry to perform sampling, quantization, and digital encoding, and, in some cases, further processing to produce a digital signal representing the physical phenomenon being measured by the transducer in a form that is readable by secure processor 310.

Secure processor 310 coordinates the operation of TTM 300, and performs certain other functions to produce an authenticatable set of captured data corresponding to each transducer within the TTM 300, and communicating the authenticatable set of captured data to CPU 202 of the data capture device via link interface 312. To this end, secure processor 310 is interfaced with non-volatile memory 314, a portion of which is a data store that stores a cryptographic key 316 with which the data obtained from each transducer is digitally signed. Secure processor may perform the digital signing in one embodiment, or the digital signing may be performed by a hardware module that is also a part of TTM 300 according to another embodiment.

In a related embodiment, secure processor 310 is programmed, or otherwise configured, to prevent any externally-initiated writing of data in non-volatile memory 314, and to prevent any externally-supplied commands from being sent to any of the other components of TTM 300.

According to various embodiments, cryptographic key 316 may take a variety of different forms. For instance, cryptographic key 316 may be a private key of a public-key cryptosystem that includes a trusted certificate authority issuing a counterpart public key and attesting to the association of the public key with the data capture device 100 or TTM 300. In another embodiment, cryptographic key 316 is a private key is shared with a trusted authority that attests to the association of the private key with the data capture device 100 or TTM 300.

The digital signature may be computed in any suitable fashion that combines the cryptographic key 316 with the digitized transducer output, some portion of that output, or some representation of that output such as a hash or other digest of the data captured by the transducer, according to various embodiments. A more detailed example of digitally signing a stream of digitized transducer output is described below with reference to FIG. 7. The use of the digital signature according to this embodiment permits the captured transducer data to be authenticatable by a third party.

Date/time clock circuitry 318 performs timekeeping in a manner that ensures reliability. In one such embodiment, date/time clock circuitry 318 periodically re-synchronizes its timekeeping with a trusted timekeeping service. In a related embodiment, date/time clock circuitry 318 also maintains and updates a trust indicator that represents a measure of reliability of the current date and time. The trust indicator may be a binary indicator indicating whether the current time is deemed valid or invalid, for instance. In a related embodiment, the trust indicator may represent a range of values, such as a time duration since the most recent successful synchronization with the time service. In another related embodiment, the trust indicator may be based on a combination of the two. For instance, in one embodiment the trust indicator may indicate a time duration measured from the last synchronization, along with a valid/invalid flag. The flag may be set to indicate an invalid time in response to a predefined time limit for the measured duration, and further in response to some other event, such as loss of power of the device.

In a related embodiment, date/time clock circuitry 318 operates in cooperation with secure processor 310, CPU 202, and communication facilities 214 of the data capture device to conduct the communications for synchronizing with a trusted time service. Any suitable trusted timekeeping protocol may be employed such as, for instance, any of the techniques described in RFC 3161, X9.95, or ISO/IEC 18014, as illustrative examples. In one embodiment, the time and date maintained and updated by circuitry 318 is associated with the digitized transducer signaling. The association may be achieved in any suitable manner, such as, for example, appending or tagging portions of the transducer signaling with a corresponding date/time indicator and related trust indicator. In related embodiments, the date/time and trust indicia are digitally signed either as part of an appended, or combined, set of transducer-plus-time data, or separately, with the transducer data association being established after separate digital signing of the transducer data, and the time/trust indicator. For the sake of brevity, the date and time may be referred to herein as simply "time." The inclusion of the trusted time with the captured transducer data allows the time of data capture to be authenticated by a third party.

Additionally, the use of positional information (e.g., from the GPS), orientation and movement data (e.g., from the accelerometer), and other data (e.g., directional heading from a compass sensor), all of which may be authenticated to the particular data capture device by virtue of having been digitally signed by a cryptographic key reliably associated with the data capture device, provides location and vantage point information about the data capture device in conjunction with the video, sound, and other observational data about the event of interest as captured by the other transducers. Furthermore, the biometric data, if available, may further be used to authenticate the purported user of the data capture device at the time of the data capture.

In one embodiment, as depicted, encryption circuitry 320 is configured to obfuscate the output of one or more of the transducers to enhance security. Encryption may be performed apart from the digital signature of transducer and time/trust data. In a related embodiment, the encryption is performed using the cryptographic key 316. In another embodiment, a different key is used to perform the encryption of the transducer output digital signal.

TTM 300 further includes a tamper-resistant encapsulation structure 322 that forms a security boundary around the various components of TTM 300 described above. The tamper-resistant encapsulation structure 322 is constructed such that production of the authenticatable set of captured data is prevented in response to a breach of the security boundary. According to one such example, the components of TTM 300 are all packaged in a single enclosure and having an arrangement such that mechanical breach of the package physically damages the circuitry irreparably, or causes secure processor 310 to destroy cryptographic key 316.

In another example embodiment, all of the components of TTM 300 are formed on a single semiconductor die, which is enclosed using chip-scale packaging techniques, where the single die is in permanent, intimate, contact with the interior surfaces of the packaging enclosure. For instance, the packaging enclosure may be grown, deposited, or bonded over and beneath the die on which the circuitry and MEMS devices TTM 300 are fabricated. The material of the packaging may be un-doped silicon, silicon dioxide, sapphire (e.g., aluminum oxide), silicon nitride, or other suitable and process-compatible insulating material having hard or brittle mechanical properties. It will be understood that these examples are given for illustration and context, and that myriad other suitable techniques for achieving tamper-resistant encapsulation 322 may be employed.

According to a related embodiment, in addition to providing a mechanical security boundary, tamper-resistant encapsulation structure 322 also provides an electrical isolation boundary that prevents electrical contact with any portion of the internal circuitry of TTM 300, except the link interface 312, from the exterior of the TTM 300.

In another related embodiment, the tamper-resistant encapsulation structure 322 permits the transmission of other physical phenomena to activate the sensing transducer(s) inside TTM 300. For example, tamper-resistant encapsulation structure 322 may include an optically clear portion to permit image capture by an image sensor. In another example, tamper-resistant encapsulation structure 322 is formed from a non-magnetic material to permit detection of ambient magnetic fields by a magnetometer sensor. In another example embodiment, tamper-resistant encapsulation structure 322 is constructed to transmit acoustic excitation from the exterior to the interior of the TTM 300 so that a microphone or ultrasonic sensor may be excited.

Figure 4A:
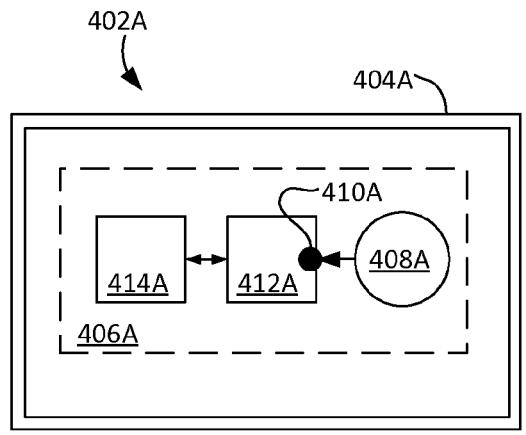
FIGS. 4A-4D are block diagrams illustrating various arrangements of the tamper-resistant encapsulation with respect to the construction of a TTM according to various embodiments.

FIGS. 4A-4D are block diagrams illustrating various arrangements of the tamper-resistant encapsulation with respect to the construction of a TTM according to various embodiments. In FIG. 4A, TTM 402A has a tamper-resistant encapsulation structure 404A around die 406A on which transducer 408A is formed along with analog circuitry 412A and digital circuitry 414A. Transducer 408A is electrically connected to analog circuitry 412A at transducer signal input node 410A.

Figure 4B:
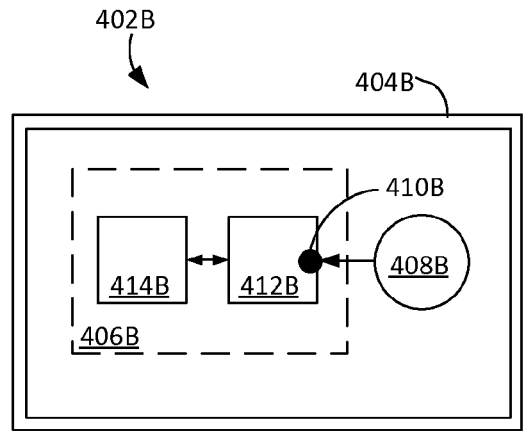

In FIG. 4B, TTM 402B has a tamper-resistant encapsulation structure 404B enclosing die 406B on which the analog circuitry 412B and digital circuitry 414B are formed. Transducer 408B is not formed on die 406B in this example, but is entirely encapsulated by encapsulation structure 404B. Transducer signal input node 410B is present on die 406B as depicted.

Figure 4C:
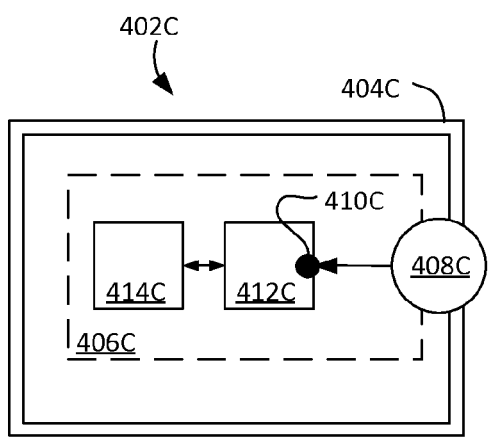

In FIG. 4C, TTM 402C has a tamper-resistant encapsulation structure 404C of which transducer 408C is a part. In this example, transducer 408C may be a diaphragm that is part of a microphone or ultrasonic sensor. Similarly, transducer 408C may be a camera with the lens thereof being incorporated, or bonded, with the encapsulation structure 404C. Also, as depicted in this example, a portion of transducer 408C is formed on die 406C, as the case may be with an image sensor or audio processing circuitry, for instance. Transducer signal input node 410C is part of analog circuitry 412C, which are electrically coupled with digital circuitry on die 406C.

Figure 4D:
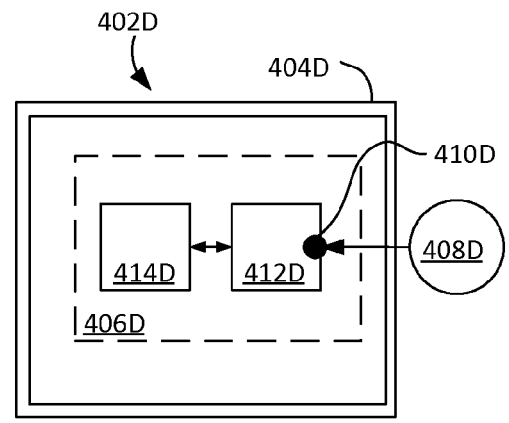

FIG. 4D illustrates another example where TTM 402D having tamper-resistant encapsulation structure 404D does not include transducer 408D within the tamper-resistant encapsulation. Here, transducer 408D is electrically coupled through the tamper-resistant encapsulation structure 404D to transducer signal input node 410D, which is a part of analog circuitry 412D situated on die 406D along with digital circuitry 414D. This example may be found, for instance, in the case where the transducer 408D is an antenna that is part of a GPS. In this example, analog and digital circuitry 412D and 414D, respectively, perform GPS reception and processing functionality. Although the transducer 408D, being on the exterior of the tamper-resistant encapsulation structure 404D, is susceptible to being tampered with, this embodiment contemplates that it is impracticable to falsely manufacture a plurality of GPS satellite signals to mislead the GPS circuitry into determining a different-than-actual location. Notably, the analog and digital circuitry 412D and 414D, respectively, which would otherwise be more easily subject to informational tampering, are safely encapsulated in tamper-resistant encapsulation structure 404D.

Figure 5:
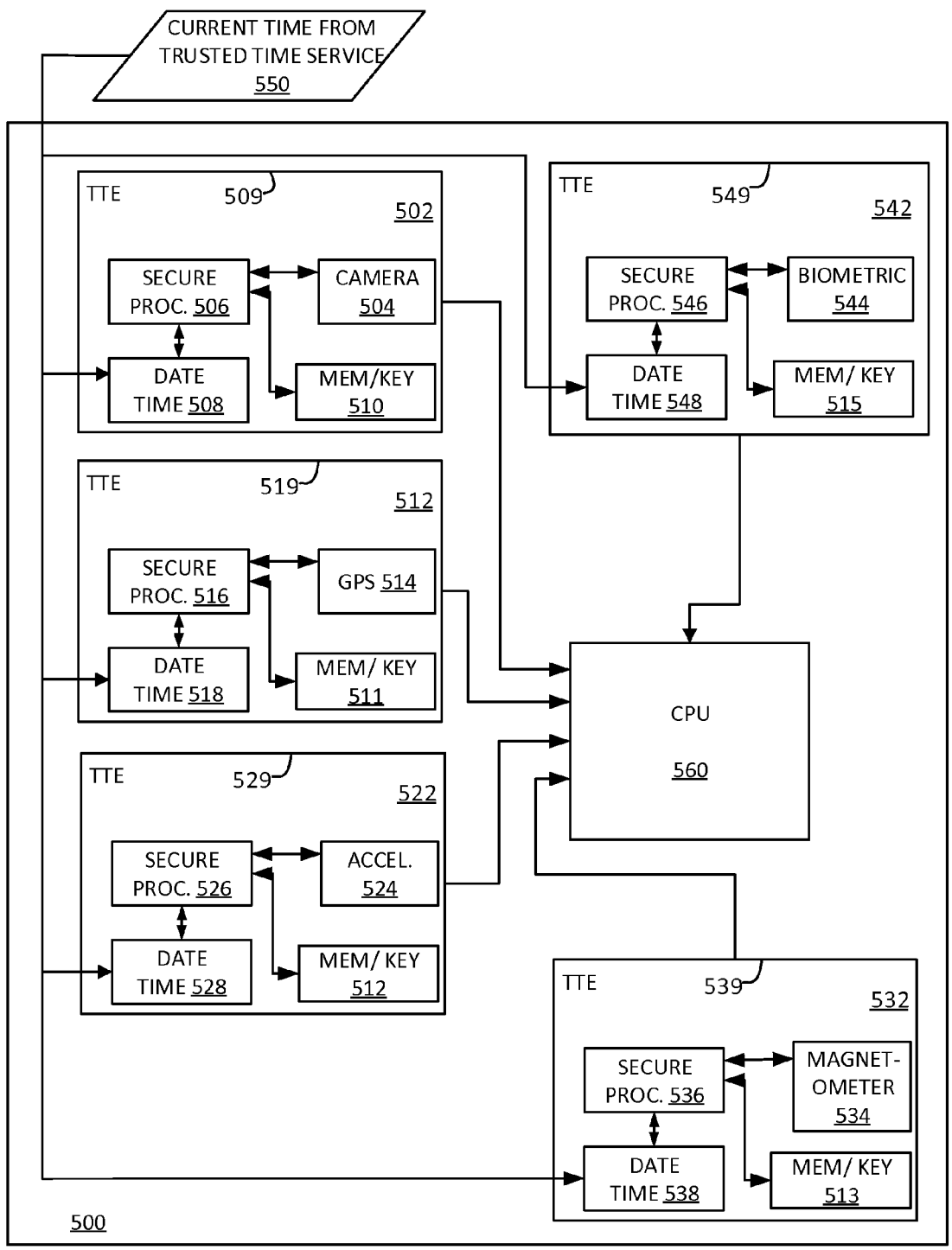
FIG. 5 is a block diagram of a portion of a data capture device according to one embodiment, in which there are a plurality of distinct TTEs corresponding to different transducers.

FIG. 5 is a block diagram of a portion of data capture device 500 according to one embodiment, in which there are a plurality of distinct TTEs 509, 519, 529, 539, 549 corresponding to different transducers. TTM 502, TTM 512, TTM 522, TTM 532, and TTM 542 each have a corresponding transducer (camera 504, GPS 514, accelerometer 524, magnetometer 534, and biometric sensor 544, respectively). Each transducer block includes power, signal conditioning, digitization, and, where appropriate, digital signal processing, circuitry, as well as interface circuitry for passing captured transducer data to respective secure processor 506, 516, 526, 536, and 546. Each TTM also includes a trusted timekeeping circuit, as indicated respectively at 508, 518, 528, 538, and 548, and a non-volatile data store that stores cryptographic keys, as indicated at 510, 511, 512, 513, and 515.

In the embodiment depicted, each trusted timekeeping circuit receives updates of the current time from a trusted time service, as represented by block 550, and provides an indication of the current time and a trust indicator for the current-time indication. In one embodiment, each cryptographic key of each TTM is a copy of the same cryptographic key, which is associated with data capture device 500. In another embodiment, two or more of the cryptographic keys are different from one another. In this latter case, each cryptographic key may be associated with one or more TTEs, which in turn may be associated with data capture device 500. Each TTM's secure processor binds the captured transducer data with the current time indicator and trust status, and digitally signs the captured transducer data to produce an authenticatable set of transducer data. This data is passed to CPU 560, which may store the authenticatable transducer data in local or removable storage media. In this embodiment, since each transducer's captured data is associated with the trusted time at which it was captured, the data from the multiple transducers may be temporally associated and mapped to a given event being captured by the data capture device.

In a related embodiment, data capture device 500 includes an additional TTM that is similar to TTM 300 in that the additional TTM has a plurality of transducer signal inputs associated with a plurality of different transducers. Accordingly, it is contemplated that one or more multi-transducer TTEs may be incorporated into a data capture device alongside single-transducer TTEs.

Figure 6:
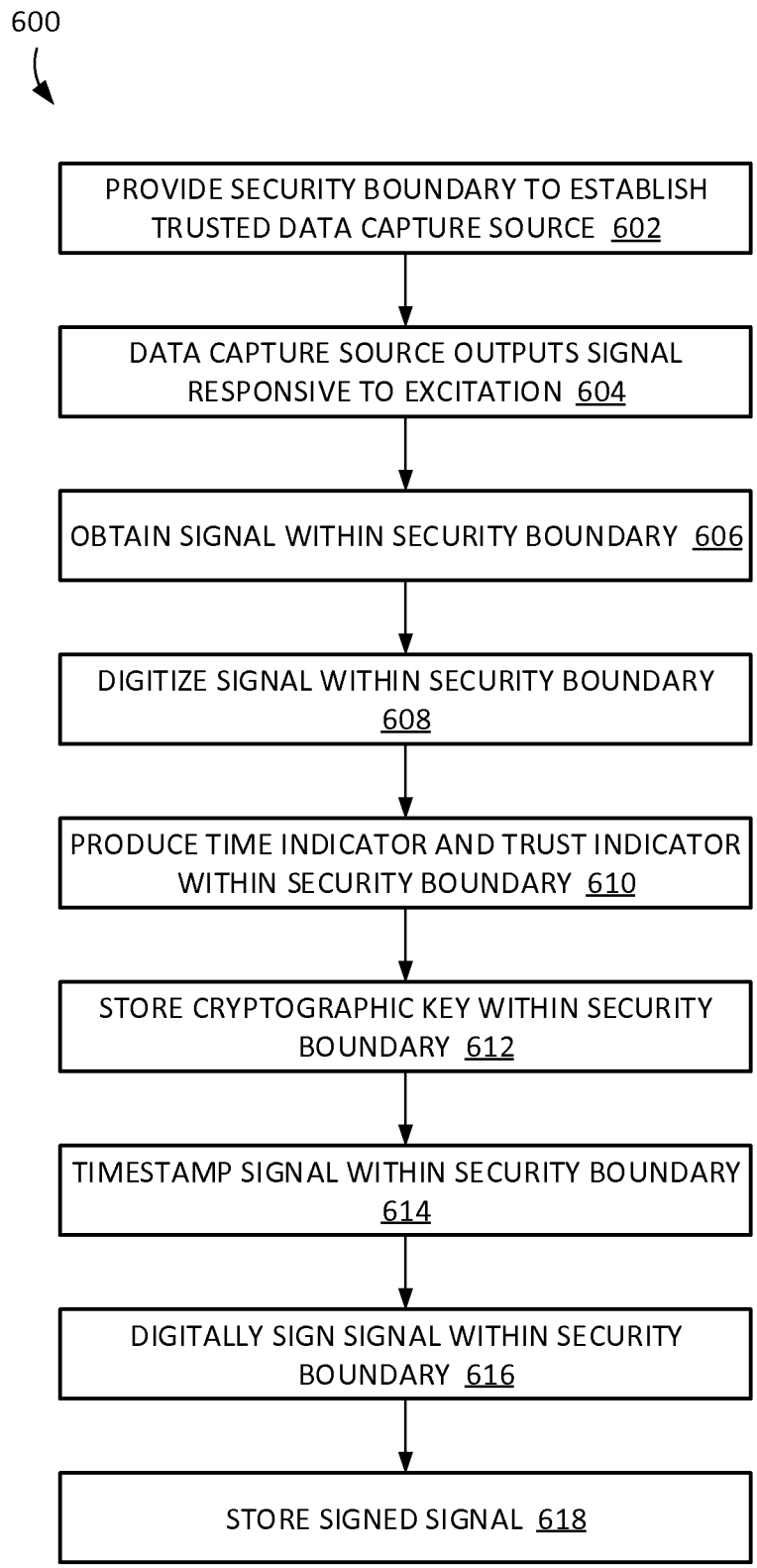
FIG. 6 is a flow diagram illustrating a process for operating a data capture device according to an embodiment of the invention.

FIG. 6 is a flow diagram illustrating a process 600 for operating a data capture device according to one embodiment of the invention. Process 600 may be performed autonomously by a data capture device in response to a human-initiated command, or in response to some triggering event or condition (e.g., passage of time, motion detection, etc.). According to the embodiment illustrated, at 602, a security boundary is provided to establish a trusted data capture source. As an example, this operation may be achieved by operating a data capturing transducer that feeds its output to circuitry in a tamper-resistant encapsulation structure. At 604 the data capture source outputs a signal in response to physical excitation, such as light impinging on an image sensor, for instance. At 606, the signal is obtained within the security boundary. This operation may take place concurrently with operation 604. At 608, the signal is digitized within the security boundary. At 610, a trusted time indicator and associated trust indicator are produced within the security boundary. At 612, a cryptographic key is stored within the security boundary. Storage of the cryptographic key in this example includes maintaining a copy of a previously-written copy of a cryptographic key.

At 614, the captured and digitized signal is timestamped, or otherwise associated with the time indicator corresponding to the time at which the signal was captured. This operation takes place within the security boundary. At 616, the signal is digitally signed within the security boundary. At 618 the signed signal is stored. Notably, this storage may be inside, or outside, of the security boundary.

In a related embodiment, multiple digitally-signed signals are obtained from multiple different trusted data sources, each of which is associated with its own security boundary. In response, the multiple digitally-signed signals are associated with one another based on the associated time indicia for each signal.

Figure 7:
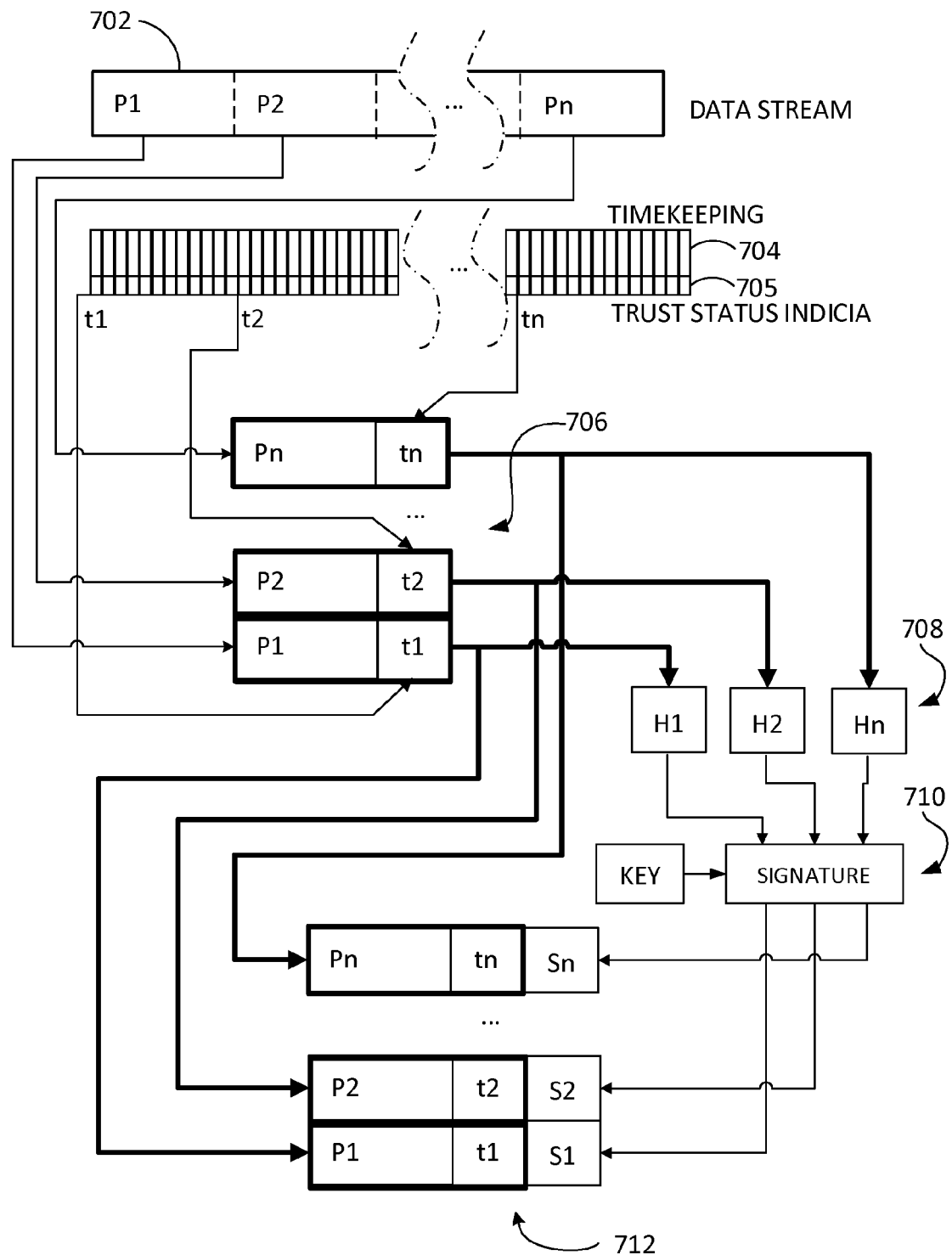
FIG. 7 is a data flow diagram illustrating timestamping and authenticity-assuring operations of a TTM according to an embodiment.

FIG. 7 is a data flow diagram illustrating timestamping and authenticity-assuring operations of a TTM according to one embodiment. In the example as depicted, data stream 702 is a digitized stream of data from a transducer making sustained measurements over a period of time, such as a video capture. Data stream 702 is a digitized representation of the transducer signaling from the image sensor. Meanwhile, the timekeeping operations of the TTM are providing current time indications 704 and corresponding trust status indicia 705. The timekeeping indicia temporal granularity may be set at a suitable resolution for the particular application. For instance, the time granularity may be set to equal the processed (or to-be-processed) video frame rate, or some multiple thereof, for example. In another example, the time granularity may be set to be substantially more coarse, such as one or two updates per second.

In the embodiment depicted, the incoming data stream 702 is divided into packets P1, P2, . . . , Pn, each having a predefined maximum size. The packets are temporarily stored in a data storage medium at 706. The data storage may operate as a first-in, first-out (FIFO) queue. Also, at 706, certain time indicators corresponding to each packet, t1, t2, . . . , tn are appended to each stored packet. In a related embodiment, the time indicators t1, t2, . . . , tn may each include the trust indicator. Next, to facilitate computation of the digital signature for each packet, a hash is computed of each stored packet P1, P2, . . . , Pn and appended time indicator t1, t2, . . . , tn to produce, in sequence, hashes H1, H2, . . . , Hn. Each hash is substantially smaller in than the packet from which it was computed, but any changes in data content may result in a substantially different hash value. In various embodiments, the hash may be computed based on a MD5 algorithm or SHA-1 algorithm, for example. Each hash is then combined with the cryptographic key associated with the TTM or greater data capture device using an exclusive-OR operation at 710 to produce a packet-specific signature S1, S2, . . . , Sn for each packet. At 712, each packet P1, P2, . . . , Tn is stored in association with the corresponding time indicator t1, t2, . . . , tn, and the corresponding digital signature S1, S2, . . . , Sn. At this stage, the storage of the digitally-signed streaming data packets may be outside of the TTM. Any modification of the packetized data or time indicator would be detectable as a failure of digital signature verification.

Verification of the signature to authenticate the packetized data to the data source would involve performing a reverse operation of the digital signature attached to, or associated with, each packet (using a public key for the TTM or data capture device, for example), to produce a hash of the combined packet and time indicator data. Separately, the hash is computed from the stored packet and time indicator value as provided with the digital signature, and the two hash values are compared. Producing matching hashes by the verification process indicates that the data is authenticated.

Figure 8:
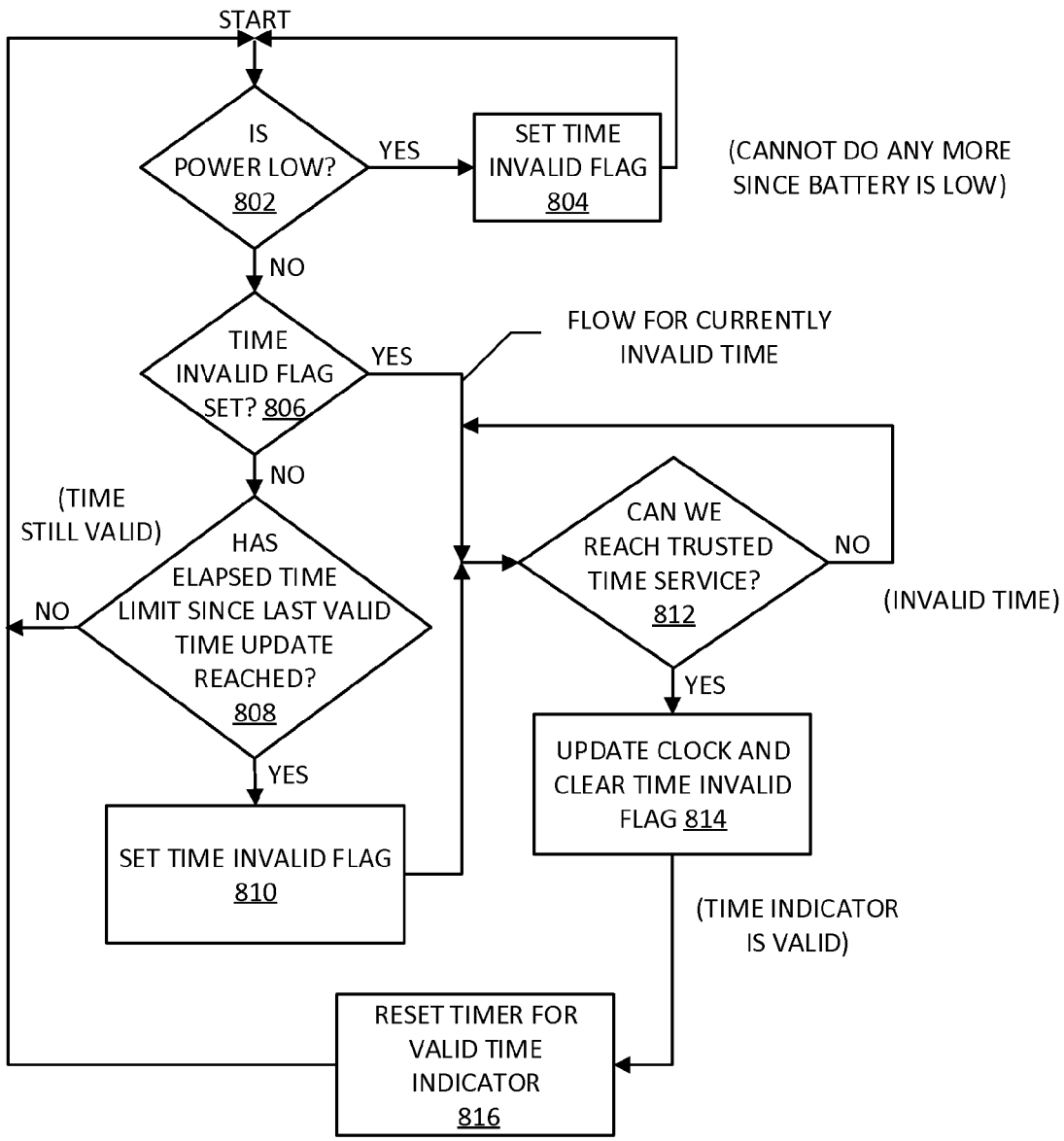
FIG. 8 is a flow diagram illustrating a process for finding a trust status for the time indicator of a TTM according to an embodiment.

Turning now to FIG. 8, a process for finding a trust status for the time indicator of a TTM according to one embodiment, is illustrated. The process begins at decision 802, where a determination is made if the power level is low. This determination may be provided by the CPU of the data capture device. If there is insufficient power to operate the time/date circuitry of the TTM, the process branches to 804, where the trust indicator is set to indicate that the accuracy of the time indicator is not assured. On the other hand, if there is sufficient power, the process continues to decision 806, which checks if the trust indicator may already be set to indicate invalid time.

If the trust indicator indicates non-assured timekeeping, the process branches to decision 812, which checks if the trusted time service may be reached. In the negative case, the trust indicator remains at the "invalid" setting. Otherwise, if the time service is reachable, at 812 the timekeeping clock of the TTM is updated with the trusted time received from the service provider, and the "invalid time" indicator is cleared (operation 814). Next, at 816, an expiration timer for the validated time is reset.

Referring again to decision 806, if the trust indicator indicates the current time is still valid since the last update, the process continues to decision 808, which checks the validity expiration timer. If the timer has not yet expired, the trust status is kept at the "valid" or assured state. Otherwise, in response to expiration of the validity duration timer, the trust status is changed to "invalid," or not assured, and the process proceeds to attempt communication with the trusted time service. In a related embodiment, the timekeeping circuit attempts to connect with the trusted time service with a duration that is shorter than the validity expiration timer so that the present time indicator may remain validated.

Figure 9:
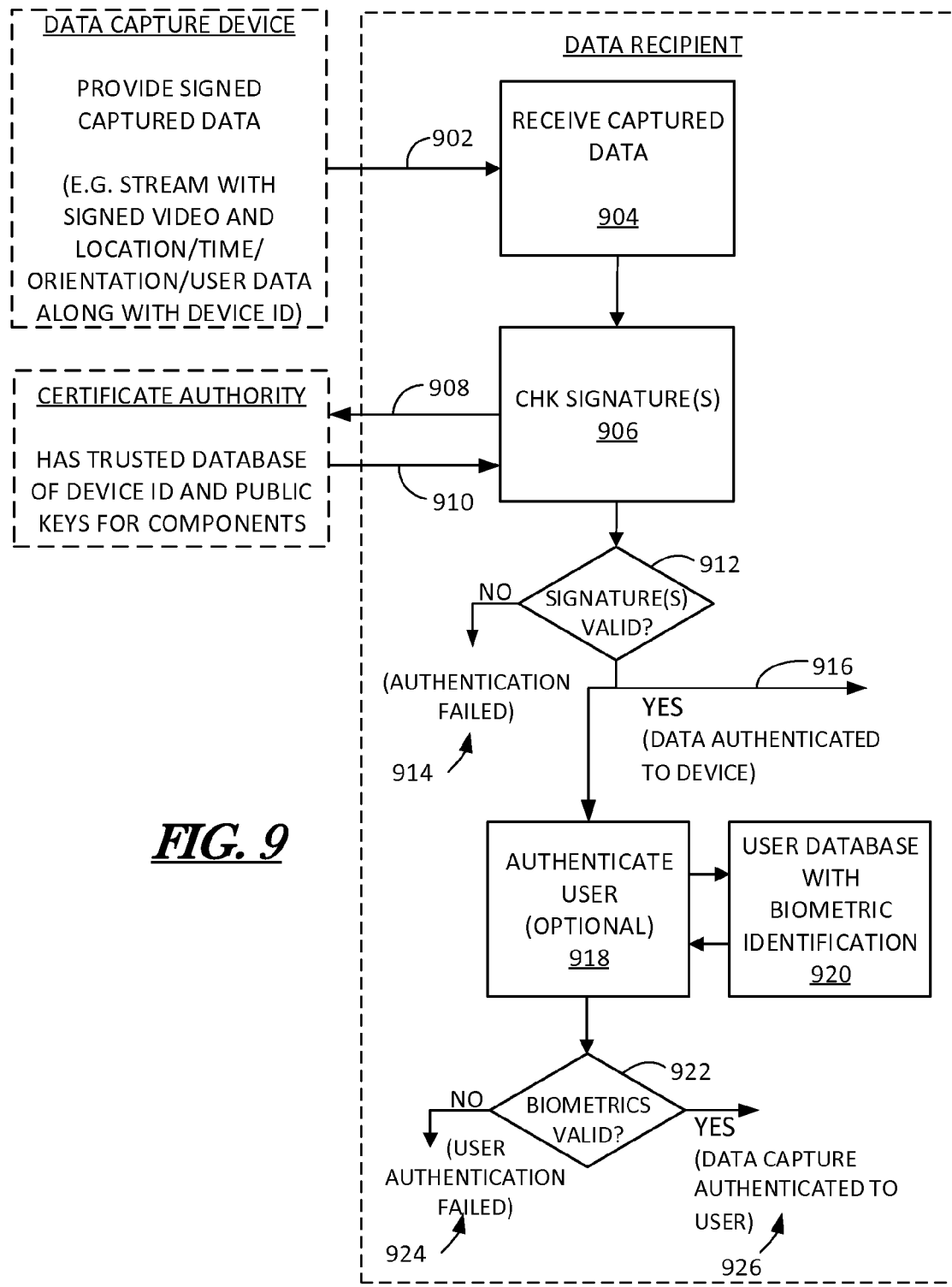
FIG. 9 is a flow diagram illustrating a process, carried out by a recipient of data captured by a data capture device, for authenticating the captured data to the data capture device and, optionally, authenticating the user, according to embodiments of the invention.

FIG. 9 is a flow diagram illustrating a process, carried out by a recipient of data captured by a data capture device, for authenticating the captured data to the data capture device and, optionally, authenticating the user, according to embodiments of the invention. At 902, the data capture device sends the captured data, digitally signed, to the data recipient. The captured data may include time and trust status information for the timekeeping, and the captured data may include one, or a plurality, of digital signatures associated with the data capture device, or the at least one TTM that forms a part of the data capture device.

The data recipient in this example may be an automated system, distinct from the data capture device. As various examples, the data recipient may be operating under the ownership or control of a private or governmental investigative agency, a court, a system administrator, corporate management, or the like. At 904, the data recipient receives the signed captured data and, at 906 verification of the digital signature is performed. Accordingly, in an embodiment employing a public-key infrastructure, a request 908 is sent to a trusted certificate authority to obtain the public key(s) associated with the data capture device. In embodiments employing only symmetric-key cryptography, the keys are not shared; rather, the certificate authority may be provided digital signatures to be decoded using the key(s) associated with the data capture device. The output of the certificate authority 910 is returned to the data recipient.

At 912 the data recipient validates the digital signature using the output of the certificate authority 910. In the event of validation failure, at 914 the process concludes with a failed authentication result. In the event of signature validation success, the captured data is deemed authentic to the data capture device. The authentication process is repeated for each separately-signed packet, or set, of captured data received from the data capture device.

A separate authentication of the user may be performed at 918, where biometric data captured from the user at the time of the other data capture (and previously authenticated to the data capture device) is checked against a user biometrics database at 920. Decision 922 compares the user biometric data received from the data capture device with biometric data stored in the database. A non-match of biometric data results in a failure of user authentication at 924, whereas a match results in positive user authentication at 926.

Figure 10:
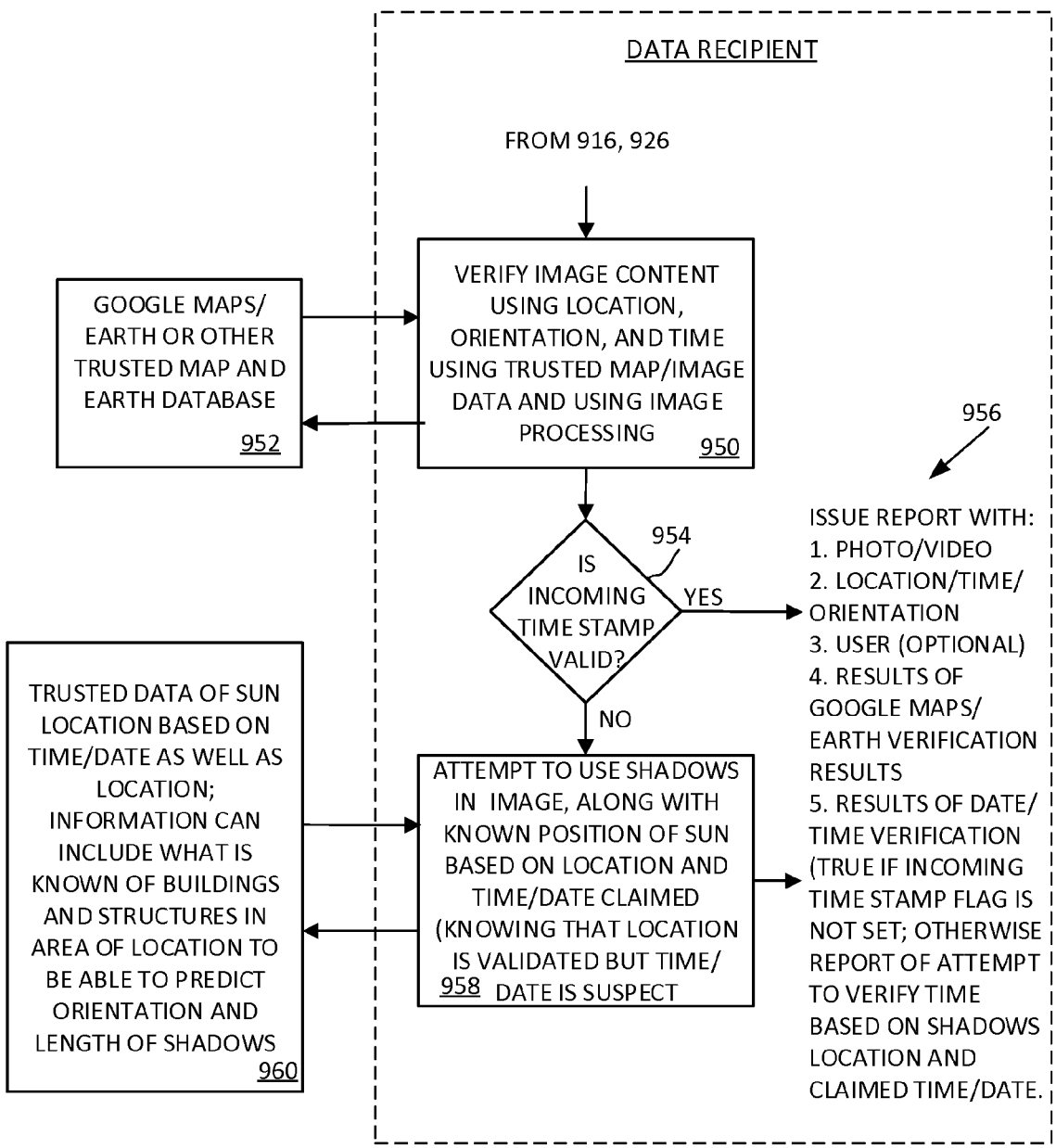
FIG. 10 is a flow diagram illustrating actions taken by the recipient of captured and authenticated image or video data from a data capture device to produce a report with location verification, according to a one embodiment.

FIG. 10 is a flow diagram illustrating actions taken by the recipient of captured and authenticated image or video data from a data capture device to produce a report with location verification, according to a related embodiment. Authenticated captured data, including location and device orientation data, as well as captured image data, are compared to a trusted third-party source of cartography or location imagery data. For instance, as depicted in FIG. 10, the location and orientation data is used to obtain an image from a similar vantage-point from a database such as Google Earth™, Microsoft Live™, Here™ by Nokia Corporation, or the like. At 950, the setting, or background, of the captured imagery and database imagery are compared, either by a human analyst, or by an image processing automated module. This comparison may provide further verification of the veracity of the location and data capture device orientation data. Accordingly, at 952 the third-party imagery provider is queried to obtain reference data.

In a related embodiment, additional information from the trusted cartography or imagery database may be used to estimate the time of image data capture in lieu of validated time indicia. Decision 954 checks if the trust indicator is indicative of the time data from the data capture device being valid. If it is, the data recipient may issue a report at 956 based on the authenticated imagery data, location and device orientation data, user data (if applicable), results of the third-party location imagery verification, and the validated time data.

In the event that the time data from the data capture device has not been validated, the data recipient may perform image analysis to obtain secondary indicia of the time during the data capture (operation 958), such as the length of shadows. This analysis involves collecting data about objects in the vicinity of the location of the data capture, along with astronomical data relating to the azimuth of the sun at the applicable time of year. The result of the image analysis is then included in the report at 956.

It should be noted that examples, as described herein, may include, or may operate on, logic or a number of components, engines, or mechanisms. Engines may be hardware (i.e., digital, analog, or mixed-signal circuitry), or software/firmware instructions stored on a tangible storage medium communicatively coupled to one or more processors in order to cause the processor to carry out the operations called for by the instructions. Engines may be hardware engines, and as such engines may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable storage medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which engines are temporarily configured, each of the engines need not be instantiated at any one moment in time. For example, where the engines comprise a general-purpose hardware processor configured using software; the general-purpose hardware processor may be configured as respective different engines at different times. Software may accordingly configure a hardware processor, for example, to constitute a particular module at one instance of time and to constitute a different module at a different instance of time.

Additional Notes & Examples

Example 1 is a data capture apparatus comprising: at least one transducer signal input node; a digitizing circuit electrically coupled to the at least one transducer signal input node, and constructed to produce digital signaling representing signaling at the at least one transducer signal input node; a data store containing a cryptographic key; a secure processor circuit electrically coupled to the digitizing circuit and the data store, the secure processor circuit being operable to produce an authenticatable set of captured data by digitally signing at least portions of the digital signaling based on the cryptographic key; and an encapsulation structure that forms a security boundary around the at least one transducer signal input node, the digitizing circuit, the data store, and the secure processor, the encapsulation structure being constructed such that production of the authenticatable set of captured data is prevented in response to a breach of the security boundary.

In Example 2, the subject matter of Example 1 optionally includes, wherein the encapsulation structure forms an electrical isolation boundary around the at least one transducer signal input node, the digitizing circuit, and the data store.

In Example 3, the subject matter of any one or more of Examples 1-2 optionally include, wherein the encapsulation structure is constructed such that the breach of the security boundary additionally causes irreparable damage to at least one of: the at least one transducer signal input node, the digitizing circuit, the data store, the secure processor, or any combination thereof.

In Example 4, the subject matter of any one or more of Examples 1-3 optionally include, wherein the encapsulation structure is constructed to permit transmission of a physical excitation phenomenon through the security boundary.

In Example 5, the subject matter of any one or more of Examples 1-4 optionally include, wherein the at least one transducer signal input node, the digitizing circuit, the data store, and the secure processor are all formed on a single semiconductor die.

In Example 6, the subject matter of Example 5 optionally includes, wherein the encapsulation structure includes a chip-scale package that encapsulates the semiconductor die.

In Example 7, the subject matter of any one or more of Examples 1-6 optionally include, further comprising: a timekeeping circuit situated within the security boundary, the timekeeping circuit being constructed to produce a time indicator of current time and a trust indicator representing a measure of reliability of the time indicator; and wherein the secure processor circuit is operable to produce the authenticatable set of captured data by further timestamping the at least portions of the digital signaling based on the time indicator and the trust indicator.

In Example 8, the subject matter of Example 7 optionally includes, wherein the timekeeping circuit, the at least one transducer signal input node, the digitizing circuit, and the data store are situated within an electrical isolation boundary formed by the encapsulation structure.

In Example 9, the subject matter of any one or more of Examples 7-8 optionally include, wherein the timekeeping circuit is formed on a common semiconductor die as the at least one transducer signal input node, the digitizing circuit, the data store, and the secure processor.

In Example 10, the subject matter of any one or more of Examples 7-9 optionally include, wherein the measure of reliability of the time indicator is based on timekeeping synchronization of the timekeeping circuit with a remote timekeeping authority.

In Example 11, the subject matter of any one or more of Examples 1-10 optionally include, wherein the cryptographic key associated with the data capture apparatus is a private key of a public-key cryptosystem that is uniquely associated with the data capture apparatus.

In Example 12, the subject matter of any one or more of Examples 1-11 optionally include, further comprising at least one transducer constructed to produce a corresponding at least one transducer signal in response to physical excitation of the at least one transducer, the at least one transducer being electrically coupled to the at least one transducer input node.

In Example 13, the subject matter of Example 12 optionally includes, wherein the at least one transducer is mechanically encapsulated within the encapsulation structure.

In Example 14, the subject matter of any one or more of Examples 12-13 optionally include, wherein a portion of the at least one transducer is mechanically encapsulated within the encapsulation structure.

In Example 15, the subject matter of any one or more of Examples 1-14 optionally include, wherein the at least one transducer signal input node is electrically coupled to at least three transducer types selected from the group consisting of: a video capture transducer, an audio capture transducer, a global position signal reception transducer, an accelerometer transducer, a biometric signal sensor transducer, an altitude sensing transducer, a directional heading sensing transducer.

In Example 16, the subject matter of any one or more of Examples 1-15 optionally include, wherein the data capture apparatus is a smartphone.

In Example 17, the subject matter of any one or more of Examples 1-16 optionally include, wherein the data capture apparatus is a video camera constructed to capture motion video.

In Example 18, the subject matter of any one or more of Examples 1-17 optionally include, wherein the data capture apparatus is a photo camera constructed to capture still images.

In Example 19, the subject matter of any one or more of Examples 1-18 optionally include, wherein the data capture apparatus is coupled to an access control system.

In Example 20, the subject matter of any one or more of Examples 1-19 optionally include, further comprising: a second encapsulation structure that forms a second security boundary around: a second at least one transducer signal input node; a second digitizing circuit electrically coupled to the second at least one transducer signal input node, the second digitizing circuit constructed to produce second digital signaling representing signaling at the second at least one transducer signal input node; a second data store containing a second digital cryptographic key associated with the data capture apparatus, and a second secure processor circuit electrically coupled to the second digitizing circuit and the second data store, the second secure processor circuit being operable to produce a second authenticatable set of captured data by digitally signing second at least portions of the second digital signaling based on the second cryptographic key; wherein the second encapsulation structure is constructed such that production of the authenticatable set of captured data is prevented in response to a breach of the second security boundary.

In Example 21, the subject matter of Example 20 optionally includes, wherein the second authenticatable set of captured data is stored in association with the authenticatable set of captured data.

Example 22 is a method for operating an authenticity-assured data capture apparatus, the method comprising: generating at least one transducer signal in response to physical excitation of a corresponding at least one transducer; digitizing the at least one transducer signal digital signaling to produce digital signaling; storing a cryptographic key associated with the data capture apparatus; digitally signing at least portions of the digital signaling based on the cryptographic key to produce an authenticatable set of captured data; and providing a security boundary within which the digitizing, storing, and digitally signing are performed, wherein production of the authenticatable set of captured data is prevented in response to a breach of the security boundary.

In Example 23, the subject matter of Example 22 optionally includes, wherein providing the security boundary includes forming an electrical security boundary around the digitizing, storing, and digitally signing operations.

In Example 24, the subject matter of any one or more of Examples 22-23 optionally include, wherein the security boundary is formed such that a breach of the security boundary prevents completion of at least one of the digitizing, storing, and digitally signing operations, or any combination thereof.

In Example 25, the subject matter of any one or more of Examples 22-24 optionally include, wherein providing the security boundary includes providing a boundary portion that permits transmission of a physical excitation phenomenon through the security boundary.

In Example 26, the subject matter of any one or more of Examples 22-25 optionally include, further comprising: producing a time indicator of current time and a trust indicator representing a measure of reliability of the time indicator; and producing the authenticatable set of captured data by timestamping the at least portions of the digital signaling based on the time indicator and the trust indicator.

In Example 27, the subject matter of Example 26 optionally includes, further comprising: maintaining an electrical security boundary by the security boundary.

In Example 28, the subject matter of any one or more of Examples 26-27 optionally include, wherein the time indicator and the trust indicator are produced within the security boundary.

In Example 29, the subject matter of any one or more of Examples 26-28 optionally include, wherein the measure of reliability of the time indicator is based on timekeeping synchronization between a timekeeping operation and a remote timekeeping authority.

In Example 30, the subject matter of any one or more of Examples 22-29 optionally include, wherein the cryptographic key associated with the data capture apparatus is a private key of a public-key cryptosystem that is uniquely associated with the data capture apparatus.

In Example 31, the subject matter of any one or more of Examples 22-30 optionally include, wherein the at least one transducer signal is generated from within the security boundary.

In Example 32, the subject matter of any one or more of Examples 22-31 optionally include, wherein the data capture apparatus is a smartphone.

In Example 33, the subject matter of any one or more of Examples 22-32 optionally include, wherein the data capture apparatus is a video camera constructed to capture motion video.

In Example 34, the subject matter of any one or more of Examples 22-33 optionally include, wherein the data capture apparatus is a photo camera constructed to capture still images.

In Example 35, the subject matter of any one or more of Examples 22-34 optionally include, wherein the data capture apparatus is electrically coupled to an access control system.

Example 36 is a data capture apparatus for ensuring data authenticity, comprising: means for receiving at least one transducer signal input; means for producing digital signaling representing the at least one transducer signal input; means for storing a cryptographic key associated with the data capture apparatus; means for producing an authenticatable set of captured data by digitally signing at least portions of the digital signaling based on the cryptographic key; and means for forming a security boundary around the means for receiving at least one transducer signal input, the means for producing the digital signaling, the means for storing, and the means for producing the authenticatable set of captured data, wherein a breach of the security boundary formed by the means for forming the security boundary prevents production of the authenticatable set of captured data.

In Example 37, the subject matter of Example 36 optionally includes, wherein the security boundary provides an electrical isolation boundary around the means for receiving at least one transducer signal input, the means for producing the digital signaling, the means for storing, and the means for producing the authenticatable set of captured data.

In Example 38, the subject matter of any one or more of Examples 36-37 optionally include, wherein the breach of the security boundary additionally causes irreparable damage to at least one of: the means for receiving at least one transducer signal input, the means for producing the digital signaling, the means for storing, and the means for producing the authenticatable set of captured data, or any combination thereof.

In Example 39, the subject matter of any one or more of Examples 36-38 optionally include, wherein the security boundary permits transmission of a physical excitation phenomenon through the security boundary.

In Example 40, the subject matter of any one or more of Examples 36-39 optionally include, wherein the means for receiving at least one transducer signal input, the means for producing the digital signaling, the means for storing, and the means for producing the authenticatable set of captured data are all formed on a single semiconductor die.

In Example 41, the subject matter of any one or more of Examples 36-40 optionally include, wherein the means for forming the security boundary includes a chip-scale package that encapsulates the semiconductor die.

In Example 42, the subject matter of any one or more of Examples 36-41 optionally include, further comprising: means for producing a time indicator of current time and a trust indicator representing a measure of reliability of the time indicator, the means for producing the time indicator and the trust indicator being situated within the security boundary; and wherein the means for producing an authenticatable set of captured data are configured to timestamp the at least portions of the digital signaling based on the time indicator and the trust indicator.

In Example 43, the subject matter of Example 42 optionally includes, wherein the means for producing the time indicator and the trust indicator are formed on a common semiconductor die as the means for receiving at least one transducer signal input, the means for producing the digital signaling, the means for storing, and the means for producing the authenticatable set of captured data.

In Example 44, the subject matter of any one or more of Examples 42-43 optionally include, wherein the measure of reliability of the time indicator is based on timekeeping synchronization of the means for producing the time indicator with a remote timekeeping authority.

In Example 45, the subject matter of any one or more of Examples 36-44 optionally include, wherein the cryptographic key associated with the data capture apparatus is a private key of a public-key cryptosystem that is uniquely associated with the data capture apparatus.

In Example 46, the subject matter of any one or more of Examples 36-45 optionally include, further comprising means for producing a transducer signal in response to physical excitation of a transducer.

In Example 47, the subject matter of Example 46 optionally includes, wherein the means for producing the transducer signal are physically encapsulated within the security boundary.

In Example 48, the subject matter of any one or more of Examples 46-47 optionally include, wherein a portion of the means for producing the transducer signal are physically encapsulated within the security boundary.

In Example 49, the subject matter of any one or more of Examples 36-48 optionally include, wherein the means for receiving at least one transducer signal input are electrically coupled to at least three transducer types selected from the group consisting of: a video capture transducer, an audio capture transducer, a global position signal reception transducer, an accelerometer transducer, a biometric signal sensor transducer, an altitude sensing transducer, a directional heading sensing transducer.

In Example 50, the subject matter of any one or more of Examples 36-49 optionally include, wherein the data capture apparatus is a smartphone.

In Example 51, the subject matter of any one or more of Examples 36-50 optionally include, wherein the data capture apparatus is a video camera constructed to capture motion video.

In Example 52, the subject matter of any one or more of Examples 36-51 optionally include, wherein the data capture apparatus is a photo camera constructed to capture still images.

In Example 53, the subject matter of any one or more of Examples 36-52 optionally include, wherein the data capture apparatus is coupled to an access control system.

In Example 54, the subject matter of any one or more of Examples 36-53 optionally include, further comprising: second means for forming a second security boundary around: second means for receiving at least one transducer signal input; second means for producing digital signaling representing the at least one transducer signal input; second means for storing a cryptographic key associated with the data capture apparatus; and second means for producing an authenticatable set of captured data by digitally signing at least portions of the digital signaling based on the cryptographic key; wherein a breach of the second security boundary formed by the prevents production of the authenticatable set of captured data.

In Example 55, the subject matter of Example 54 optionally includes, wherein the second authenticatable set of captured data is stored in association with the authenticatable set of captured data.

Example 56 is a method for authenticating data provided by a data capture device, the method comprising: receiving, from the data capture device, a set of digitally-signed captured data, the set of captured data having been produced from: a generated transducer signal in response to physical excitation of a corresponding at least one transducer, digitization of the transducer signal to produce digital signaling, digital signing of at least portions of the digital signaling based on a stored cryptographic key, and provision of a security boundary within which the digitization, storage of the cryptographic key, and digital signing are performed, wherein the security boundary is arranged such that production of the authenticatable set of captured data is prevented in response to a breach of the security boundary; and verifying a digital signature of the received set of digitally-signed captured data, including communicating with a trusted authority to obtain information for confirming a predefined association of the cryptographic key with the data capture device.

In Example 57, the subject matter of Example 56 optionally includes, wherein the digitally-signed captured data includes data captured from a biometric sensor of the data capture device, the method further comprising: in response to a successful verification of the digital signature, verifying the data captured from the biometric sensor against a predefined association of biometric data with a particular individual user.

In Example 58, the subject matter of any one or more of Examples 56-57 optionally include, wherein the provision of the security boundary includes formation of an electrical security boundary around the digitizing, storing, and digitally signing operations.

In Example 59, the subject matter of any one or more of Examples 56-58 optionally include, wherein the security boundary is formed such that a breach of the security boundary prevents completion of at least one of the digitizing, storing, and digitally signing operations, or any combination thereof.

In Example 60, the subject matter of any one or more of Examples 56-59 optionally include, wherein provision of the security boundary includes providing a boundary portion that permits transmission of a physical excitation phenomenon through the security boundary.

In Example 61, the subject matter of any one or more of Examples 56-60 optionally include, wherein the set of captured data are further produced to include: a time indicator of current time and a trust indicator representing a measure of reliability of the time indicator; and timestamping the digital signaling based on the time indicator and the trust indicator.

In Example 62, the subject matter of Example 61 optionally includes, wherein the time indicator and the trust indicator are produced within the security boundary.

In Example 63, the subject matter of any one or more of Examples 61-62 optionally include, wherein the measure of reliability of the time indicator is based on timekeeping synchronization between a timekeeping operation and a remote timekeeping authority.

In Example 64, the subject matter of any one or more of Examples 56-63 optionally include, wherein the cryptographic key associated with the data capture apparatus is a private key of a public-key cryptosystem that is uniquely associated with the data capture apparatus.

In Example 65, the subject matter of any one or more of Examples 56-64 optionally include, wherein the at least one transducer signal is generated from within the security boundary.

In Example 66, the subject matter of any one or more of Examples 56-65 optionally include, wherein the data capture apparatus is a smartphone.

In Example 67, the subject matter of any one or more of Examples 56-66 optionally include, wherein the data capture apparatus is a video camera constructed to capture motion video.

In Example 68, the subject matter of any one or more of Examples 56-67 optionally include, wherein the data capture apparatus is a photo camera constructed to capture still images.

In Example 69, the subject matter of any one or more of Examples 56-68 optionally include, wherein the data capture apparatus is electrically coupled to an access control system.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A data capture apparatus comprising:
at least one transducer signal input node;
a digitizing circuit electrically coupled to the at least one transducer signal input node, and constructed to produce digital signaling representing signaling at the at least one transducer signal input node;
a data store containing a cryptographic key;
a secure processor circuit electrically coupled to the digitizing circuit and the data store, the secure processor circuit being operable to produce an authenticatable set of captured data by digitally signing at least portions of the digital signaling based on the cryptographic key;
an encapsulation structure that forms a security boundary around the at least one transducer signal input node, the digitizing circuit, the data store, and the secure processor, the encapsulation structure being constructed such that production of the authenticatable set of captured data is prevented in response to a breach of the security boundary; and
a timekeeping circuit situated within the security boundary, the timekeeping circuit being constructed to produce a time indicator of current time and a trust indicator representing a measure of reliability of the time indicator;
wherein the secure processor circuit is operable to produce the authenticatable set of captured data by further associating the at least portions of the digital signaling with the time indicator and the trust indicator; and
wherein the measure of reliability of the time indicator is based on timekeeping synchronization of the timekeeping circuit with a remote timekeeping authority.

2. The data capture apparatus according to claim 1, wherein the encapsulation structure forms an electrical isolation boundary around the at least one transducer signal input node, the digitizing circuit, and the data store.

3. The data capture apparatus according to claim 1, wherein the encapsulation structure is constructed such that the breach of the security boundary additionally causes irreparable damage to at least one of:
the at least one transducer signal input node, the digitizing circuit, the data store, the secure processor, or any combination thereof.

4. The data capture apparatus according to claim 1, wherein the encapsulation structure is constructed to permit transmission of a physical excitation phenomenon through the security boundary.

5. The data capture apparatus according to claim 1, wherein the at least one transducer signal input node, the digitizing circuit, the data store, and the secure processor are all formed on a single semiconductor die.

6. The data capture apparatus of claim 5, wherein the encapsulation structure includes a chip-scale package that encapsulates the semiconductor die.

7. The data capture apparatus of claim 1, wherein the timekeeping circuit, the at least one transducer signal input node, the digitizing circuit, and the data store are situated within an electrical isolation boundary formed by the encapsulation structure.

8. The data capture apparatus according to claim 1, further comprising at least one transducer constructed to produce a corresponding at least one transducer signal in response to physical excitation of the at least one transducer, the at least one transducer being electrically coupled to the at least one transducer input node.

9. The data capture apparatus of claim 8, wherein the at least one transducer is mechanically encapsulated within the encapsulation structure.

10. The data capture apparatus of claim 8, wherein a portion of the at least one transducer is mechanically encapsulated within the encapsulation structure.

11. The data capture apparatus according to claim 1, wherein the at least one transducer signal input node is electrically coupled to at least three transducer types selected from the group consisting of:
a video capture transducer, an audio capture transducer, a global position signal reception transducer, an accelerometer transducer, a biometric signal sensor transducer, an altitude sensing transducer, a directional heading sensing transducer.

12. The data capture apparatus according to claim 1, further comprising:
a second encapsulation structure that forms a second security boundary around:
a second at least one transducer signal input node;
a second digitizing circuit electrically coupled to the second at least one transducer signal input node, the second digitizing circuit constructed to produce second digital signaling representing signaling at the second at least one transducer signal input node;
a second data store containing a second digital cryptographic key associated with the data capture apparatus, and
a second secure processor circuit electrically coupled to the second digitizing circuit and the second data store, the second secure processor circuit being operable to produce a second authenticatable set of captured data by digitally signing second at least portions of the second digital signaling based on the second cryptographic key;
wherein the second encapsulation structure is constructed such that production of the authenticatable set of captured data is prevented in response to a breach of the second security boundary.

13. The data capture apparatus of claim 12, wherein the second authenticatable set of captured data is stored in association with the authenticatable set of captured data.

14. A method for operating an authenticity-assured data capture apparatus, the method comprising:
generating at least one transducer signal in response to physical excitation of a corresponding at least one transducer;
digitizing the at least one transducer signal digital signaling to produce digital signaling;
storing a cryptographic key associated with the data capture apparatus;
digitally signing at least portions of the digital signaling based on the cryptographic key to produce an authenticatable set of captured data;
providing a security boundary within which the digitizing, storing and digitally signing are performed, wherein production of the authenticatable set of captured data is prevented in response to a breach of the security boundary; and
producing a time indicator of current time and a trust indicator representing a measure of reliability of the time indicator;
wherein production of the authenticatable set of captured data includes associating the at least portions of the digital signaling with the time indicator and the trust indicator; and
wherein the measure of reliability of the time indicator is based on timekeeping synchronization between a timekeeping operation and a remote timekeeping authority.

15. The method of claim 14, wherein providing the security boundary includes forming an electrical security boundary around the digitizing storing and digitally signing operations.

16. The method according to claim 14, wherein the security boundary is formed such that a breach of the security boundary prevents completion of at least one of the digitizing, storing, and digitally signing operations, or any combination thereof.

17. The method according to claim 14, wherein providing the security boundary includes providing a boundary portion that permits transmission of a physical excitation phenomenon through the security boundary.

18. The method according to claim 14, wherein the time indicator and the trust indicator are produced within the security boundary.

19. The method of claim 14, further comprising: maintaining an electrical security boundary by the security boundary.

20. The method according to claim 14, wherein the cryptographic key associated with the data capture apparatus is a private key of a public-key cryptosystem that is uniquely associated with the data capture apparatus.

21. The method according to claim 14, wherein the at least one transducer signal is generated from within the security boundary.

* * * * *

UNITED STATES PATENT AND TRADEMARK OFFICE
CERTIFICATE OF CORRECTION

PATENT NO. : 9,881,184 B2  
APPLICATION NO. : 14/927782  
DATED : January 30, 2018  
INVENTOR(S) : Mark A. Allyn Page 1 of 1

It is certified that error appears in the above-identified patent and that said Letters Patent is hereby corrected as shown below:

In the Claims

In Column 22, Line 9, in Claim 14, after "storing", insert --,--

In Column 22, Line 26, in Claim 15, delete "digitizing storing" and insert --digitizing, storing,-- therefor In Column 22, Line 41, in Claim 19, after "comprising:", insert --¶--

Signed and Sealed this  
Seventh Day of December, 2021

Drew Hirshfeld  
*Performing the Functions and Duties of the*  
*Under Secretary of Commerce for Intellectual Property and*  
*Director of the United States Patent and Trademark Office*